US009148612B2

(12) United States Patent
Holley (10) Patent No.: US 9,148,612 B2
(45) Date of Patent: Sep. 29, 2015

(54) APPARATUS AND METHODS FOR ACCESSING CONTENT USING ALTERNATIVE IDENTIFIERS

(75) Inventor: Eric Holley, Atlanta, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 575 days.

(21) Appl. No.: 12/824,020

(22) Filed: Jun. 25, 2010

(65) Prior Publication Data

US 2011/0321089 A1    Dec. 29, 2011

(51) Int. Cl.

| H04N 21/84 | (2011.01) |
|---|---|
| H04N 5/445 | (2011.01) |
| H04N 21/462 | (2011.01) |
| H04N 21/434 | (2011.01) |
| H04N 21/482 | (2011.01) |

(52) U.S. Cl.
CPC ....... *H04N 5/44543* (2013.01); *H04N 21/4348* (2013.01); *H04N 21/4622* (2013.01); *H04N 21/4823* (2013.01); *H04N 21/84* (2013.01)

(58) Field of Classification Search
None
See application file for complete search history.

(56) References Cited

U.S. PATENT DOCUMENTS

| 6,133,910 A | 10/2000 | Stinebruner |
| 6,396,549 B1 * | 5/2002 | Weber ........................... 348/734 |
| 6,766,526 B1 * | 7/2004 | Ellis ................................ 725/57 |
| 7,152,236 B1 * | 12/2006 | Wugofski et al. ............... 725/40 |
| 2001/0005905 A1 * | 6/2001 | Saib et al. ....................... 725/57 |
| 2002/0116713 A1 | 8/2002 | Mukai et al. |
| 2003/0056216 A1 * | 3/2003 | Wugofski et al. ............... 725/46 |
| 2006/0095472 A1 * | 5/2006 | Krikorian et al. .......... 707/104.1 |

FOREIGN PATENT DOCUMENTS

EP    1763235 A2 *  3/2007

OTHER PUBLICATIONS

Kalva et al. "Multi-view Video Navigation Using Motion Sensing Remote Controllers," International Conference on Consumer Electronics, 2008, Digest of Technical Papers, Jan. 9-13, 2008; Las Vegas, NV; 2 pages.
European Search Report dated Nov. 9, 2011, for corresponding European Patent Application No. 11167838.9; 8 pages.
Examination Report dated Nov. 12, 2012, for corresponding European Patent Application No. 11167838.9, 5 pages.

* cited by examiner

*Primary Examiner* — Cai Chen
(74) *Attorney, Agent, or Firm* — Seed IP Law Group PLLC (57) ABSTRACT

Apparatus and methods are described for allowing users to access channels of a receiving device using custom channel identifiers rather than content provider assigned channel identifiers. A receiving device receives a first set of channel identifiers assigned by a content provider for a plurality of channels. The receiving device further receives a second set of custom channel identifiers identifying the plurality of channels. At least a portion of the first set of channel identifiers maps to the second set of channel identifiers. The user provides user input specifying one of the second identifiers to access and the receiving device correlates the user input to a corresponding first identifier to determine the selected channel the user desires to access.

18 Claims, 6 Drawing Sheets

APPARATUS AND METHODS FOR ACCESSING CONTENT USING ALTERNATIVE IDENTIFIERS

BACKGROUND

Content distribution systems, such as cable and television distribution systems, arrange audio/video content in a static listing of numerical channel identifiers that are configured by the content provider. When a subscriber switches service from one content provider to another, while the content is still the same, the channel identifiers are different. For example, a sports channel may be accessible on channel 110 of a first content provider and channel 127 of a second content provider. Due to the large quantity of channels carried on both services, the amount of time required for a subscriber to acclimate to the new content provider is large. Thus, it would be desirable for the subscriber to reorder the content into an order that they find useful and comfortable to utilize. Additionally, it would be desirable for the content provider to offer mappings of competing services to make new subscriber transition easier and more enjoyable.

BRIEF DESCRIPTION OF THE DRAWINGS

The same number represents the same element or same type of element in all drawings.

DETAILED DESCRIPTION OF THE DRAWINGS

The various embodiments described herein generally provide apparatus, systems and methods which facilitate the reception, processing and outputting of content from one or more sources, via one or more communications mediums (or networks), for use by one or more users (or subscribers). More particularly, described herein are techniques for reordering the identifiers utilized by a user for accessing content in a reception system. Particularly, content may be assigned a custom identifier, allowing the user to access the content using an identifier that is more convenient or easier for the user to remember.

In at least one embodiment, the content to be received, processed, outputted and/or communicated may come in any of various forms including, but not limited to, audio, video, data, information, or otherwise. As used herein, "content" refers to information communicated via a media (e.g., on a receiver or otherwise) without concern as to the design, placement or layout of the information on the media. Further as used herein, "content providers" generally refer to the operators of communication distribution systems which deliver content to an end user, such as a satellite television, cable television or internet protocol television (IPTV) provider.

As used herein, a "content selection menu" refers to any type of interface allowing a user to select content for viewing/playback. The content selected by a user may include video content, audio content, audio/video content, textual data, graphical data or the like. In one embodiment, a content selection menu is embodied as an electronic programming guide (EPG), allowing a user to select television broadcast programming for viewing or recording. However, content selection menus may also include video-on-demand selection menus, audio content selection menus (e.g., internet radio stations, MP3 playback systems), internet streaming video and/or audio/video selection menus, selection menus of locally stored audio and/or video content or any combination thereof.

At least one embodiment described herein comprises a receiving device configured to receive and output audio and/or video content for presentation by a presentation device. A presentation device includes an output interface that communicatively couples to a presentation device, such as a display device (e.g., television or monitor) or an audio output device (e.g., stereo system, speakers or the like). The receiving device also includes control logic operable to receive a content provider's channel identifiers that are utilized by a user to access a plurality of channels accessible through the content provider's service. The control logic is further operable to receive a second set of custom channel identifiers and determine a mapping between the two sets of channel identifiers. The control logic is further operable to allow the user to navigate the plurality of channels accessible through the receiving device using either the first set of channel identifiers or the second identifiers. Thus, the user can utilize the content provider's channel listings or alternatively use a custom channel listing. For example, the user may desire to create their own channel listing or may alternatively desire to utilize a channel listing corresponding with another content provider.

The custom set of channel identifiers may be used in association with any manner of user input requesting to access particular channels accessible through the receiving device. For example, the user may input a direct numerical specification of a desired channel using the custom set of channel identifiers (e.g., the user directly inputs the custom channel identifier for a selected channel). The custom set of channel identifiers may also be utilized when the user is channel surfing, allowing the user to surf through the channels in a different order. In another embodiment, the receiving device may output a content selection menu (e.g., an electronic programming guide) that presents channels with an associated custom channel identifier. The electronic programming guide may be ordered according to either the content provider's channel identifiers or a custom set of identifier's depending on desired design criteria.

The techniques illustrated herein will be described in the context of a television broadcast system and more particularly as applied to a television receiver configured to receive a plurality of television channels from a television distribution network. Exemplary television receivers include cable television receivers, satellite television receivers, terrestrial over-the-air television receivers and interne protocol television (IPTV) receivers. However, it is to be appreciated that the techniques described herein may be applied to other types of audio and/or video reception and output devices including any type of content selection menu or otherwise including any type of channel navigation technique.

Figure 1:
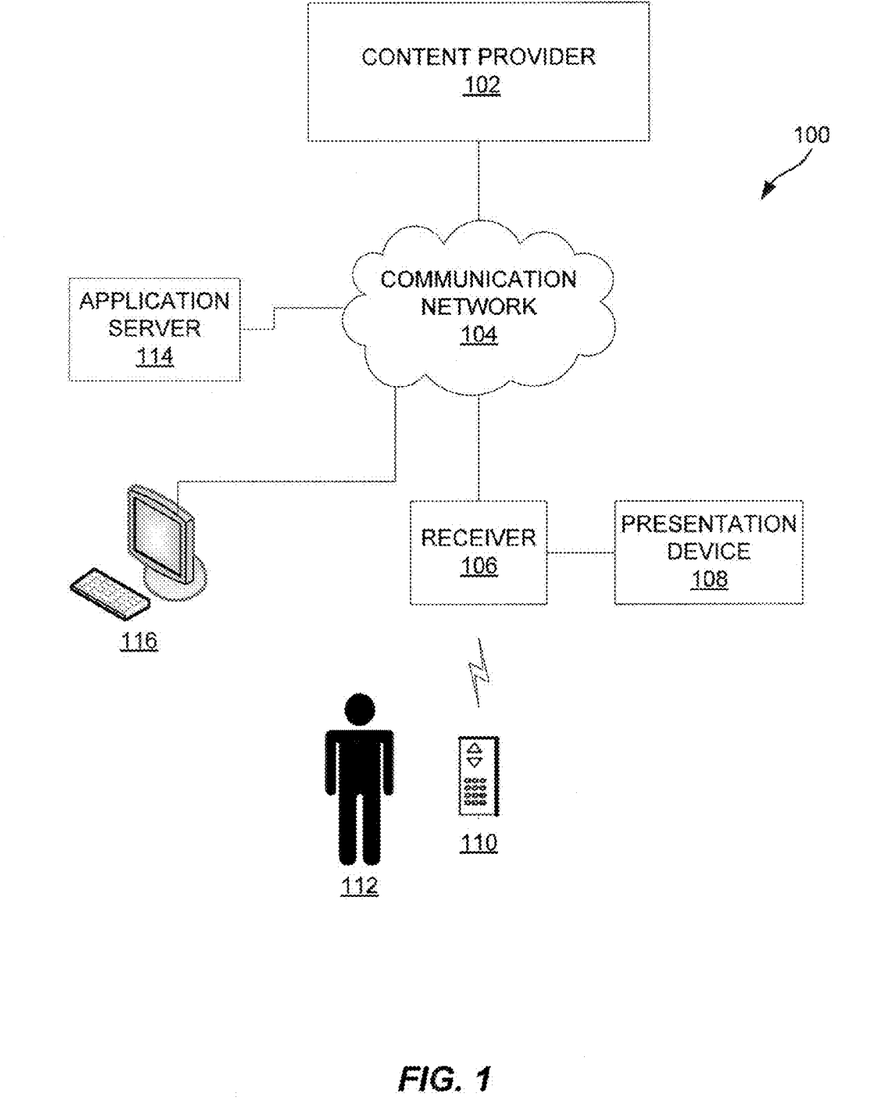
FIG. 1 represents an embodiment of a content distribution system.

FIG. 1 is an embodiment of a communication system. The communication system includes a content provider 102, a communication network 104, a television receiver 106, a presentation device 108, a remote control 110, an application server 114 and a communication device 116. Each of these components will be discussed in greater detail below. The communication system 100 may include other components, elements or devices not illustrated for the sake of brevity.

The content provider 102 is operable for receiving, generating and communicating content to one or more television receivers 106. The content to be received, processed, outputted and/or communicated may come in any of various forms including, but not limited to, audio, video, data, information, or otherwise. In at least one embodiment, the content provider 102 is operable for receiving various forms and types of content from other sources, aggregating the content and transmitting the content to the television receiver 106 through the communication network 104. It is to be appreciated that the content provider 102 may receive practically any form and/or type of information from one or more sources including streaming television programming, recorded audio or video, electronic programming guide data and the like.

The communication network 104 is operable to communicatively couple together the content provider 102, the television receiver 106, the application server 114 and/or communication device 116. The communication network 104 may be embodied as one or more logical and/or physical communication networks operable to communicatively couple any combination of the content provider 102, the television receiver 106, the application server 114 and/or communication device 116. These networks may utilize any desired combination of wired (e.g., cable and fiber) and/or wireless (e.g., cellular, wireless, satellite, microwave, and radio frequency) communication mediums and any desired network topology (or topologies when multiple mediums are utilized). Exemplary communication networks include television distribution networks (e.g., satellite and cable television networks), wireless communication networks, public switched telephone networks (PSTN), and local area networks (LAN) or wide area networks (WAN) providing data communication services.

In at least one embodiment, the communication network 104 comprises a television distribution network operable to transmit content and/or other data from the content provider 102 to the television receiver 106. Exemplary communication networks 104 include terrestrial, cable, satellite and internet protocol television (IPTV) distribution systems. In at least one embodiment, the communication network 104 broadcasts or multicasts content to a plurality of television receivers 106. The communication network 104 may also distribute content to a specific addressable television receiver 106, such as video-on-demand content and the like. In at least one embodiment, the content provider 102 may be embodied as a transmission facility of the communication network 104. Exemplary content providers 102 include over-the-air (OTA) terrestrial transmission facilities, cable television distribution head-ends, satellite television uplink centers, broadband or internet servers and the like. The communication network 104 may also distribute non-video content to a television receiver 106, such as electronic programming guide data and custom sets of channel identifiers and the like which are processed and/or utilized by the television receiver 106.

In at least one embodiment, the communication network 104 may be configured to distribute non-television data, such as the internet traffic between various devices. For example, the communication network 104 may communicatively couple the application server 114 and the communication device 116 over the Internet or other wide area network (WAN). As discussed in further detail below, the application server 114 is operable to receive user input from the communication device 116 specifying custom sets of channel identifiers which are utilized by the television receiver 106.

In at least one embodiment, the communication network 104 is operable to communicatively couple the application server 114 and the television receiver 106 and transmit the channel identifiers to the television receiver 106. In another embodiment, the communication network 104 communicatively couples the application server 114 and the content provider 102. The content provider 102 receives the custom sets of channel identifiers from the application server 114 via the Internet or other data communication network and initiates transmission of the custom channel identifiers to a specific television receiver 106 via a television distribution network.

The television receiver 106 is operable to receive content from the communication network 104 and output the received content for presentation by the presentation device 108. In at least one embodiment, the presentation device 108 is a display device (e.g., a television) configured to display content to a user 112. The television receiver 106 may receive an audio/video stream in any format (e.g., analog or digital format) and output the audio/video stream for presentation by the presentation device 108. In at least one embodiment, the television receiver 106 is a set-top box (e.g., a satellite television receiver, cable television receiver, terrestrial television receiver, internet protocol television receiver or any other type of receiver/converter box) or other similar device that processes and provides one or more audio and/or video output streams to the presentation device 108 for presentation to the user 112. The television receiver 106 may be further configured to output menus and other information that allow the user 112 to control the output of audio/video content by the television receiver 106, view electronic programming guides, set recording timers and the like.

The presentation device 108 may comprise any type of device capable of receiving and outputting a video signal in any format. Exemplary embodiments of the presentation device 108 include a television, a computer monitor, a liquid crystal display (LCD) screen, a touch screen and a projector. The presentation device 108 and the television receiver 106 may be communicatively coupled through any type of wired or wireless interface. For example, the presentation device 108 may be communicatively coupled to the television receiver 106 through a coaxial cable, component or composite video cables, an HDMI cable, a VGA or SVGA cable, a Bluetooth or WiFi wireless connection or the like. In some embodiments, the television receiver 106 and the presentation device 108 may be integrated as a device combining the functionality of a display device and a television receiver, such as a television with integrated CableCard or tru2way functionality or the like.

The user 112 may control the television receiver 106 using a remote control 110 or other type of data input device compatible with the television receiver 106. The remote control 110 may comprise any system or apparatus configured to remotely control the output of content by the television receiver 106. For example, the remote control 110 may include buttons for receiving input from the user 112. In at least one embodiment, the remote control 110 includes a touch pad or the like for receiving input from the user 112. The remote control 110 may minimally include a transmitter or transceiver, an input device (e.g., a keypad) and a processor or control logic for controlling the operation of the remote control 110. The remote control 110 may communicate commands to the television receiver 106 requesting to playback content, change channels, temporally move through content (e.g., fast-forward or reverse), adjust the volume, access electronic programming guides and other content selection menus, set or edit recording timers, edit preferences of the television receiver 106 and the like. In some embodiments, the remote control 110 may additionally be configured to remotely control the presentation device 108. The remote control 110 may communicate with the television receiver 106 and/or the presentation device 108 through any type of wireless communication medium, such as infrared (IR) signals or radio-frequency (RF) signals, such as WiFi, Bluetooth, Zigbee or the like.

Channels are typically accessed by the user 112 through the television receiver 106 using an associated channel identifier for the channel. For example, the content provider 102 may transmit 500 different channels, each assigned a particular channel identifier from 1-500. The user 112 may utilize the remote control 110 keypad, in conjunction with the television receiver 106, to input a channel identifier for their favorite news network, such as channel number 105. In a particular distribution system, each user may access the same channel content using the same standard set of channel identifier for the service. However, as described above, it may be desirable for users to access channels using a custom set of channel identifiers.

In accordance with the techniques described herein, the television receiver 106 is operable to receive a first set of channel identifiers assigned by the content provider 102 to identify a plurality of channels. The television receiver 106 is further operable to receive a second set of channel identifiers for the plurality of channels. At least a portion of the second set of channel identifiers are different than the first set of channel identifiers. For example, in one embodiment, the first set of channel identifiers may correspond with the channel mapping for the content provider 102. The second set of channel identifiers may correspond with a channel mapping for a different content provider. The second set of channel identifiers may then be mapped to a corresponding one of the first set of channel identifiers such that the user 112 may access the channels accessible via the television receiver 106 using the custom channel identifiers rather than the content provider defined channel identifiers.

In at least one embodiment, the second set of channel identifiers are mapped to PIDs corresponding with channels associated with the first identifiers. PIDs are identifiers that identify packets that correspond with a particular channel. Each channel may have one or more PIDs that are associated with particular content for the channel (e.g., video content, primary audio content, secondary audio content and the like). For example, if a second identifier (e.g., channel 100) is mapped to a first identifier (e.g., channel 305) for a channel, then the television receiver 106 may store a mapping of the second identifier to one or more PIDs for the channel. Thus, when a user 112 inputs the second identifier, the television receiver 106 operates to identify the PIDs corresponding with the second channel identifier and initiates reception of the corresponding PID data associated with the channel.

In at least one embodiment, the television receiver 106 is operable to receive user input requesting to view a selected channel. The user input specifies one of the second set of channel identifiers corresponding with the selected channel. The television receiver 106 is operable to correlate the second channel identifier with the corresponding first channel identifier for the channel and initiate reception of the selected channel from the content provider 102 via the communication network 104.

In at least one embodiment, the user 112 may specify one or more of the custom channel identifiers via a user interface accessible through the television receiver 106. In another embodiment, the content provider 102 may provide pre-generated custom channel identifiers to the television receiver 106 for use by user 112. For example, the content provider 102 may provide a custom mapping of channels that allow the user 112 to use the channel mapping for a competing television service. Thus, the user 112 can migrate from one content provider to another without having to learn another channel mapping for the new service.

In another embodiment, the user 112 may access a web site provided via the application server 114 using the communication device 116. The application server 114 is operable for receiving, generating and communicating content by and between the communication device 116 and the television receiver 106. In at least one embodiment, application server 114 is operable for receiving custom channel mapping information from the user 112. For example, the application server 114 may provide an interface showing channels accessible through the content provider 102 and solicit input from the user 112 specifying a channel identifier for any or all of the channels. Examples of the communication device 116 which may communicate with the application server 114 may include, but are not limited to, computers, personal digital assistants (PDAs), tablet computers and other computing devices and/or mobile communication devices (e.g., mobile or wireless telephones).

The application server 114 is further operable to initiate transmission of the custom channel mapping information to the television receiver 106. The application server 114 may be configured to communicate directly with the television receiver 106 via the communication network 104 or may alternatively communicate with the television receiver 106 indirectly via the content provider 102. In some embodiments, the application server 114 may be operable to query the television receiver 106 for a presently stored custom channel mapping and output the custom channel mapping for further editing by the user 112. While a plurality of custom channel identifier definition techniques have been illustrated herein, it is to be appreciated that any combination of the foregoing may be utilized in accordance with desired design criteria.

Figure 2:
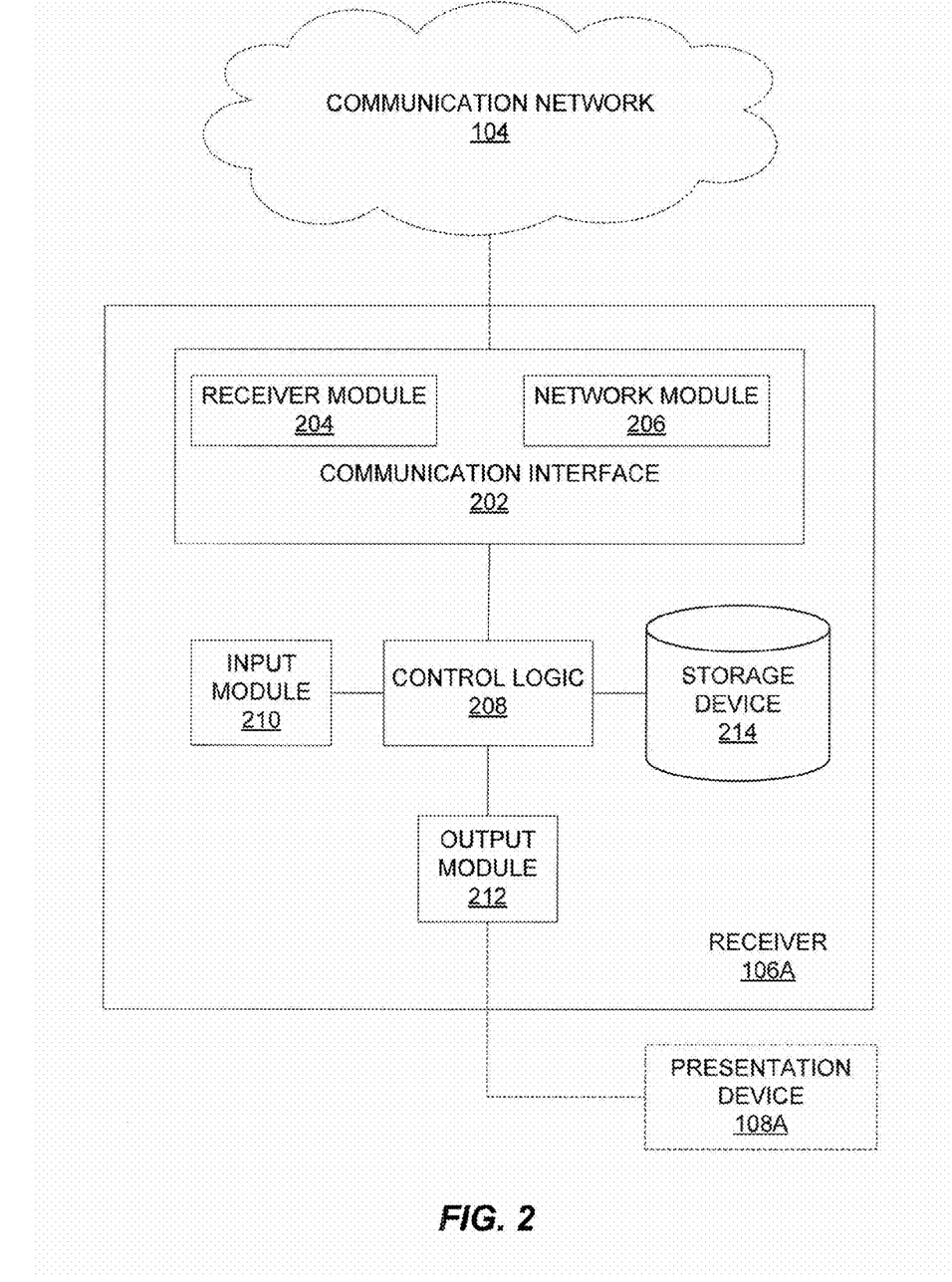
FIG. 2 represents an embodiment of a television receiver of the content distribution system of FIG. 1.

FIG. 2 illustrates an embodiment of a television receiver 106 of FIG. 1. The television receiver 106A is comprised of a communication interface 202, control logic 208, an input module 210, an output module 212 and a storage device 214. In at least one embodiment, the communication interface 202 is comprised of a receiver module 204 and a network module 206.

The communication interface 202 is operable to exchange information with the communication network 104. In at least one embodiment, the communication interface 202 comprises a receiver module 204 operable to receive a television signal containing television content from the communication network 104. For example, the receiver module 204 may comprise one or more television tuners operable to receive television signals from one or more of an over the air (OTA) broadcast network, cable broadcast network and satellite broadcast network. The receiver module 204 may also be configured to receive television programming from an internet protocol television (IPTV) network.

In at least one embodiment, the communication interface 202 comprises a network module 206 operable to exchange information with a data communication network. For example, the communication interface 202 may receive electronic programming guide data, system preferences, web browsing data or other video data from an external source via the communication network 104. In at least one embodiment, the network module 206 is operable to receive television signals from Internet Protocol (IP) sources as well as related content data from the communication network 104. The receiver module 204 and the network module 206 may be integrated into a single component or multiple components depending on desired design criteria. Furthermore, the receiver module 204 and the network module 206 may be operable to communicate with external devices using any number of physical and/or logical communication networks 104.

The control logic 208 is operable for controlling the operation of the television receiver 106A. As used herein, control logic 208 refers to a single processing device or a group of inter-operational processing devices. The operation of control logic 208 may be controlled by instructions executable by control logic 208. Some examples of instructions are software, program code and firmware. Various embodiments of control logic 208 include any sort of microcontroller or microprocessor executing any form of software code. In at least one embodiment, the control logic 208 controls the reception of data and/or content by the communication interface 202 and the output of content by the output module 212 to the presentation device 108. In at least one embodiment, the control logic 208 is operable to generate content selection menus, such as electronic programming guide menus, for presentation by the presentation device 108.

The control logic 208 is communicatively coupled to the storage device 214, which is operable to store data during operation of the control logic 208. Such data may include software and firmware executed by the control logic 208 as well as system and/or program data generated during the operation of the control logic 208. In at least one embodiment, the storage device 214 is operable for storing custom sets of channel identifiers and mapping information correlating specific custom channel identifiers with channel identifiers assigned by the content provider 102. Storage device 214 may comprise any sort of digital memory (including any sort of read only memory (ROM), RAM, flash memory and/or the like) or any combination of the aforementioned.

In at least one embodiment, the television receiver 106A optionally includes a storage medium operable to persistently store data for use by the television receiver 106A. For example, the television receiver 106A may include recording functionality configured to persistently store video signals for subsequent playback by a user. The storage medium may comprise any type of non-volatile memory appropriate for storing video signals recorded by the television receiver 106A. Exemplary storage mediums include hard drives (e.g., magnetic memory), flash memory, battery backed up memory and the like.

The television receiver 106A also includes an output module 212 operable to interface with the presentation device 108. More particularly, the output module 212 is operable to output information for presentation by the presentation device 108 (see FIG. 1). The output module 212 may be operable to output any type of presentation data to the presentation device 108, including audio data, video data, audio/video (A/V) data, textual data, imagery or the like. In other embodiments, the output module 212 may comprise a network interface operable to transmit data to other components, devices or elements, such as other computers, servers and the like. The output module 212 may receive data from the control logic 208 and/or other components of the television receiver 106A for output to the presentation device 108 (see FIG. 1).

In at least one embodiment, the output module 212 may include multiple output connections operable to transmit data to the presentation device 108 in multiple formats through multiple communication mediums. For example, the output module 212 may include a modulator operable to modulate data onto an NTSC channel for transmission to the presentation device 108 through a coaxial cable. In other embodiments, the output module 212 may include composite or component outputs which communicatively couple to similar outputs of the presentation device 108 through appropriate cabling. In at least one embodiment, the output module 212 comprises a High Definition Multimedia Interface (HDMI) that outputs high definition content to the presentation device 108.

In at least one embodiment, the output module 212 bi-directionally communicates with the presentation device 108. For example, an HDMI port is capable of bi-directionally communicating with the presentation device 108. The output module 212 may receive various types of data from the presentation device 108 over the bi-directional communication link. For example, the presentation device 108 may transmit information identifying itself and/or its capabilities to the output module 212. Other bi-directional communication links, such as Ethernet, WiFi, IEEE 1394, USB and the like are also possible in accordance with various embodiments.

The input module 210 is operable to interface with one or more input devices, such as the remote control 110 (see FIG. 1). The input device may comprise any type of device for inputting data to the television receiver 106A. More particularly, data received from the input device may be used to control the operation of the control logic 208 and/or the output of data to the presentation device 108. The input module 210 and the remote control 110 may be communicatively coupled using any type of wired or wireless connection, including USB, WiFi, infrared and the like. In some embodiments, the input module 210 may comprise a wireless receiver for receiving any type of RF or IR communication from the remote control 110. Exemplary input devices include, keyboards, mice, buttons, joysticks, microphones, remote controls, touch pads and the like.

In at least one embodiment, the communication interface 202 receives a defined set of channel identifiers for the content provider 102 (see FIG. 1). The content provider defined set of channel identifiers includes the specific identifiers utilized by the user 112 (see FIG. 1) to access the channels receivable by the television receiver 106. For example, each channel may be identified by a unique channel identifier for the content provider 102. The defined set of channel identifiers may be received in association with data presented in an electronic programming guide, channel listings that are otherwise not viewable, graphical icon data and receiver specific data. The user 112 may select programming from the electronic programming guide for viewing, recording and the like. In some embodiments, the user 112 may navigate the programming receivable by the television receiver 106 by directly inputting a numerical channel identifier or by providing a channel up/down command or channel recall command via the remote control 110 and/or other input device associated with the television receiver 106A.

In accordance with the techniques described above, the control logic 208 is operable to receive a second set of channel identifiers for a plurality of channels receivable by the television receiver 106A. For example, the communication interface 202 may receive the custom identifiers from an external source (e.g., the application server 114 or the content provider 102). In at least one embodiment, the control logic 208 outputs a graphical user interface allowing the user 112 to define the custom channel identifiers. The control logic 208 is operable to utilize the custom channel identifiers to allow the user 112 to navigate channels using different identifiers than those originally assigned by the content provider 102.

Figure 3:
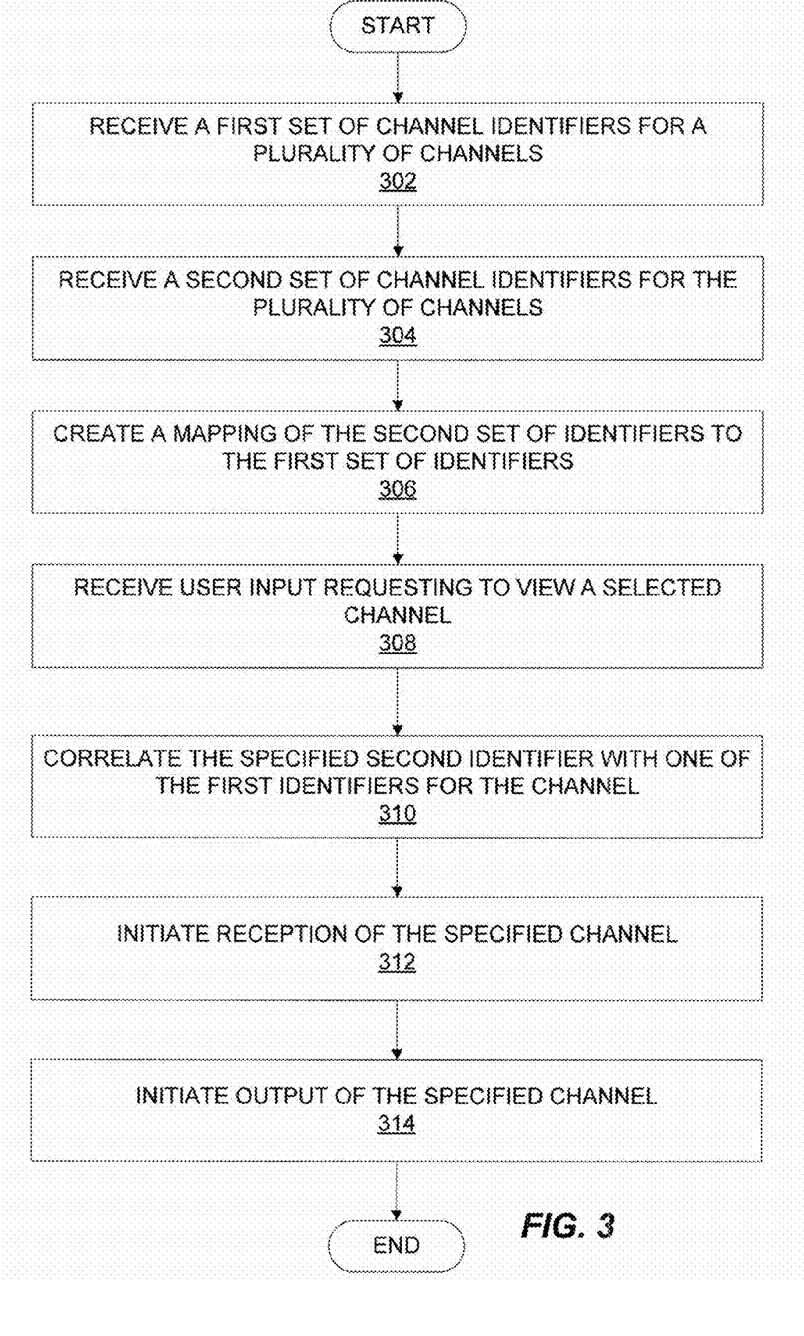
FIG. 3 represents an embodiment of a process for processing a user request to access content.

FIG. 3 represents an embodiment of a process for processing a user request to access content. The process of FIG. 3 will be described in the context of receiving a request to access a television channel and is described in the relation to the communication system 100 illustrated in FIGS. 1-2. However, it is to be appreciated that the process may be applied to accessing other types of content and may be applied by devices other than the television receiver 106A. The process of FIG. 3 is not all-inclusive and may include other operations not illustrated for the sake of brevity.

The process includes the receiving, at a television receiver 106A (see FIG. 2), a first set of channel identifiers provided by a content provider to identify a plurality of channels of programming content (operation 302). For example, a television receiver may receive one or more channels of video content as well as information that allows a user 112 to differentiate/access one channel from another, such as alphabetic or numerical channel identifiers.

The process further includes receiving, at the television receiver 106A (see FIG. 2), a second set of channel identifiers identifying the plurality of channels (operation 304). More particularly, at least a portion of the second set of channel identifiers correlate with the first set of channel identifiers. For example, a sports network may be assigned channel 105 in the first set of channel identifiers and channel 50 in the second set of channel identifiers. In at least one embodiment, the control logic 208 (see FIG. 2) outputs a selection menu allowing the user to define the second set of channel identifiers and any correlation thereof. For example, the user 112 chooses to create a list of channel identifiers corresponding to their favorite and most viewed channels.

Alternatively, the television receiver 106 may receive the second set of channel identifiers from an external source. For example, the television receiver 106A may prompt the user 112 to download a second set of channel identifiers correlating with another content provider's channel identifiers during an initial set-up process. If available, the receiver prompts the user 112 to make a selection regarding whether to download to the receiver 106 a listing representing a second content provider's identifiers for a plurality of channels. If the user 112 inputs a selection to download the custom channel mapping, then the receiver 106 initiates a download of the second set of channel identifiers from an external source, such as the content provider 102 and/or the application server 114.

In at least one embodiment, after the requested download of a second set of channel identifiers, the user 112 may be prompted with the option of modifying the downloaded channel identifiers. For example, the user 112 may reorder the second content provider's listing, delete entries, add entries, and the like. In at least one embodiment, if the user 112 chooses not to download the listing, then the user 112 may manually input a second listing of channel identifiers representing a plurality of channels. For example, the user 112 may choose to create a list of channel identifiers corresponding to their favorite and most viewed channels.

In operation 306, the control logic 208 (see FIG. 2) creates a mapping linking entries in the second set of channel identifiers to entries in the first channel set of channel identifiers (operation 306). In other words, the control logic 208 stores information linking a particular custom channel identifier to the original channel identifier for the associated channel.

In operation 308, the control logic 208 (see FIG. 2) receives user input requesting to view a selected channel of the plurality of channels (operation 308). More particularly, the user input specifies a selected one of the second set of channel identifiers. For example, the user input may request viewing of channel "50".

In operation 310, the control logic 208 (see FIG. 2) correlates the selected one of the second set of channel identifiers with one of the first set of channel identifiers corresponding with the selected channel. For example, the storage device 214 may store a table mapping the second set of channel identifiers to the first set of channel identifiers. In the present example, the control logic 208 correlates the user input "50" with the original channel "127".

In operation 312, the control logic 208 commands the communication interface 202 to receive the selected channel. For example, the control logic 208 may command the communication interface 202 to receive data transmitted on a particular carrier or transmitted using a particular packet identifier (PID). In operation 314, the control logic 208 initiates output of the selected channel to the presentation device 108A via the output module 212.

Figure 4:
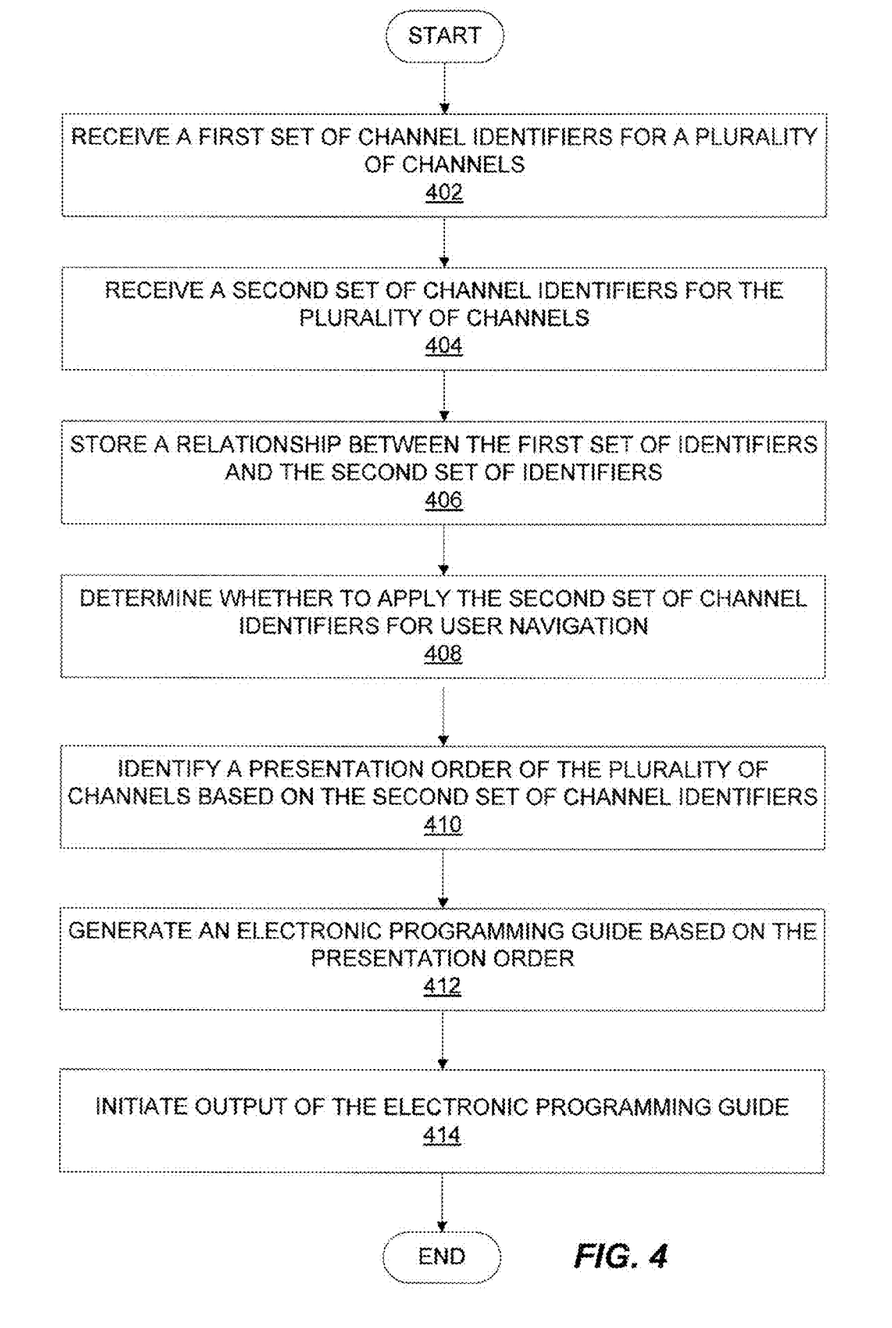
FIG. 4 represents an embodiment of a process for generating a content selection menu.

FIG. 4 represents an embodiment of a process for generating a content selection menu. The process of FIG. 4 will be described in the context of generating an electronic programming guide menu and is described in relation to the communication system 100 illustrated in FIGS. 1-2. However, it is to be appreciated that the process may be applied to generating other content selection menus and may be applied by devices other than the television receiver 106A. The process of FIG. 3 is not all-inclusive and may include other operations not illustrated for the sake of brevity.

The process includes receiving, at a television receiver 106A (see FIG. 2), a first set of channel identifiers provided by a content provider to identify a plurality of channels of programming content (operation 402) and receiving a second set of channel identifiers identifying the plurality of channels (operation 404). The process further includes storing a relationship between the first set of channel identifiers, the second set of channel identifiers and the plurality of channels (operation 406). Operations 402, 404 and 406 may be performed similarly to operations 302, 304 and 306 described above and further discussion is omitted herein for the sake of brevity.

The process further includes determining, in the control logic 208, whether to apply the second set of channel identifiers for user navigation of the plurality of channels (operation 408). For example, the user 112 (see FIG. 1) may select an option in a menu to specify which set of channel identifiers to utilize for user navigation. Alternatively, the user 112 may press a particular button or sequence of buttons to input the desired set of channel identifiers for use in navigation of the channels.

The process further includes identifying a presentation order of the plurality of channels based on the second set of channel identifiers (operation 410). In at least one embodiment, the presentation order is based on numeric identifiers included within the second set of channel identifiers. For example, take the situation where the content provider transmits channels A, B, C, D and E. The content provider originally assigns the channels the following identifiers: A (105), B (130), C (143), D (167) and E (175). Thus, the channels may have an original presentation order of A, B, C, D and E in the electronic programming guide. Take for example further the situation where the user 112 reassigns the channels the following identifiers: A (120), B (103), C (117), D (101) and E (109). Thus, in at least one embodiment, the control logic 208 may determine the new presentation order of the channels as D, B, E, C and A.

In some embodiments, the presentation order may be determined based on both the first set of channel identifiers and the second set of channel identifiers. For example, not all of the channels having a content provider defined identifier may be assigned a corresponding custom channel identifier. Thus, the channels may be ordered according to their original identifier. For example, channel F may be assigned an original identifier of 109 and may not have a corresponding custom identifier. Thus, in the aforementioned example, the channels may be ordered D, B, E, F, C and A in the electronic programming guide.

In operation 412, the control logic 208, generates an electronic programming guide viewable on a presentation device based on the presentation order. For example, the graphical element corresponding with each channel of the electronic programming guide may be ordered as D, B, E, C and A or D, B, E, F, C and A. In at least one embodiment, the electronic programming guide may visually demonstrate the mapping between the first set of channel identifiers and the second set of identifiers. For example, the mapping may be demonstrated through a side by side display of the second identifier next to its mapped identifier from the first set of channel identifiers. In at least one embodiment, either of the first identifier or the second identifier may be differentiated through some type of demarcation element, such as differing font, color, style or symbol (e.g., #, * and the like).

Figure 5:
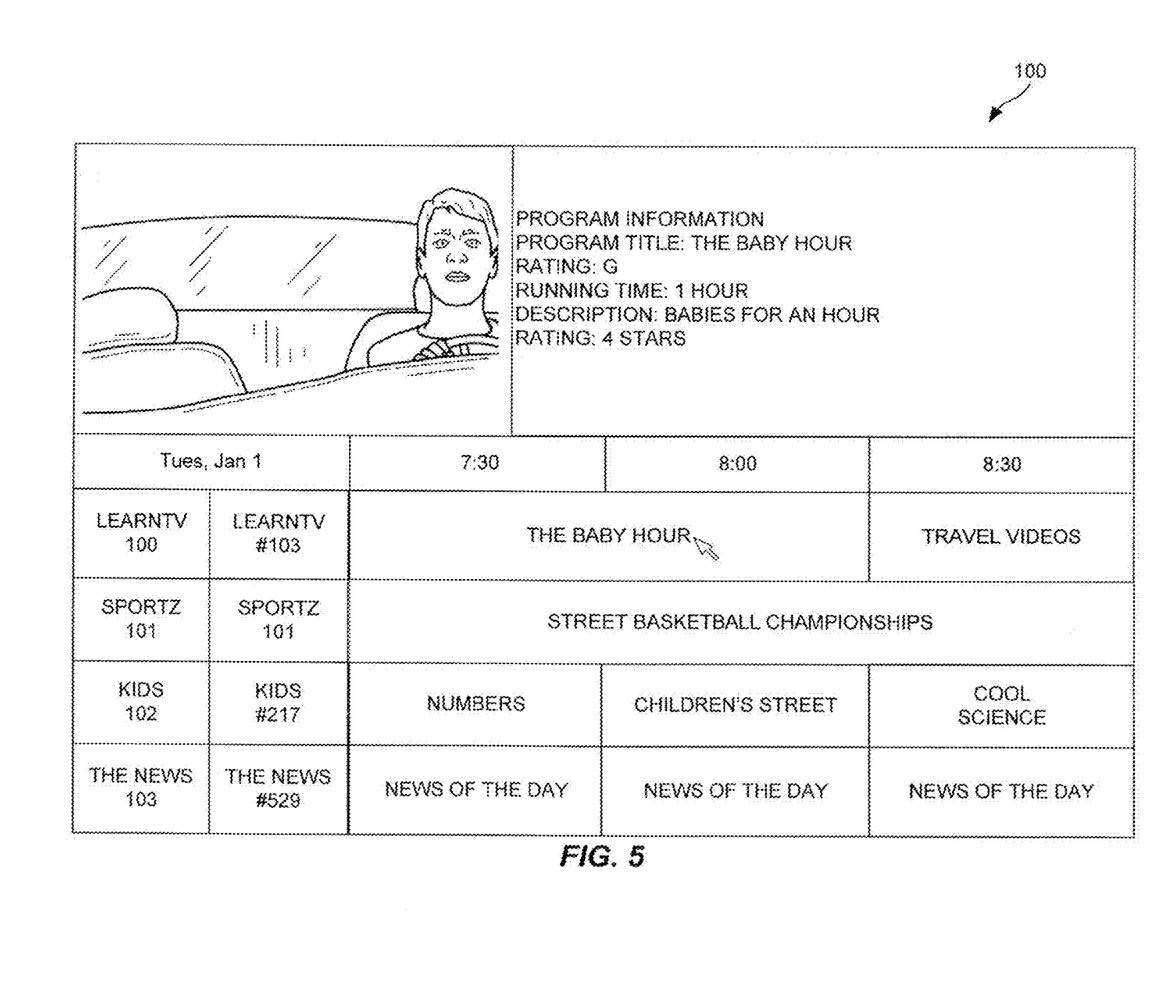
FIG. 5 illustrates an embodiment of an electronic programming guide screen illustrating a mapping between a first set of channel identifiers and a second set of channel identifiers for a plurality of channels.

In operation 414, the control logic 208 (see FIG. 2) initiates output of the generated electronic programming guide to the presentation device 108 via the output module 212. FIG. 5 illustrates an embodiment of an electronic programming guide screen 500 illustrating a mapping between a first set of channel identifiers and a second set of channel identifiers for a plurality of channels. In FIG. 5, the channel graphical elements are ordered according to the second set of channel identifiers for the channels (e.g., 100, 101, 102 and 103) and the first column illustrates the corresponding custom channel identifier for the channel. The second column illustrates the corresponding content provider defined channel identifier and each content provider defined channel identifier is illustrated with a demarcation element.

In one embodiment, the user 112 can navigate the electronic programming guide and/or the channels utilizing either set of channel identifiers. For example, the user 112 can select a particular show's graphical element or channel graphical element to access the channel directly. The user 112 can enter a channel number with no demarcation element to navigate to the corresponding channel using the custom channel identifier matching the channel number. For example, the input "103" would navigate to the "News" channel. If the user 112 wants to navigate using the first set of channel identifiers, then the user 112 utilizes the demarcation element "#" plus the channel number to navigate to the channel. For example, the user input "#103" would navigate to the "LearnTV" channel. Thus, the user 112 can easily navigate the channels receivable by the television receiver 106A through either set of channel identifiers. A similar technique may be used by the user 112 to input requested channels outside of the electronic programming guide. For example, "# Channel Up" may channel surf in the order of the first set of channel identifiers, whereas "Channel Up" may channel surf in the order of the second set of channel identifiers.

Sometimes, a user may request to access a channel identifier from the second set of identifiers that is not associated with a channel. In at least one embodiment, if the channel identifier is entered without a demarcation and the channel identifier cannot be found in the second set of channel identifiers, then the control logic 208 searches the first set of identifiers for a matching channel. If a matching channel is located in the first set of identifiers, then the control logic 208 operates to initiate output of the associated channel.

Figure 6:
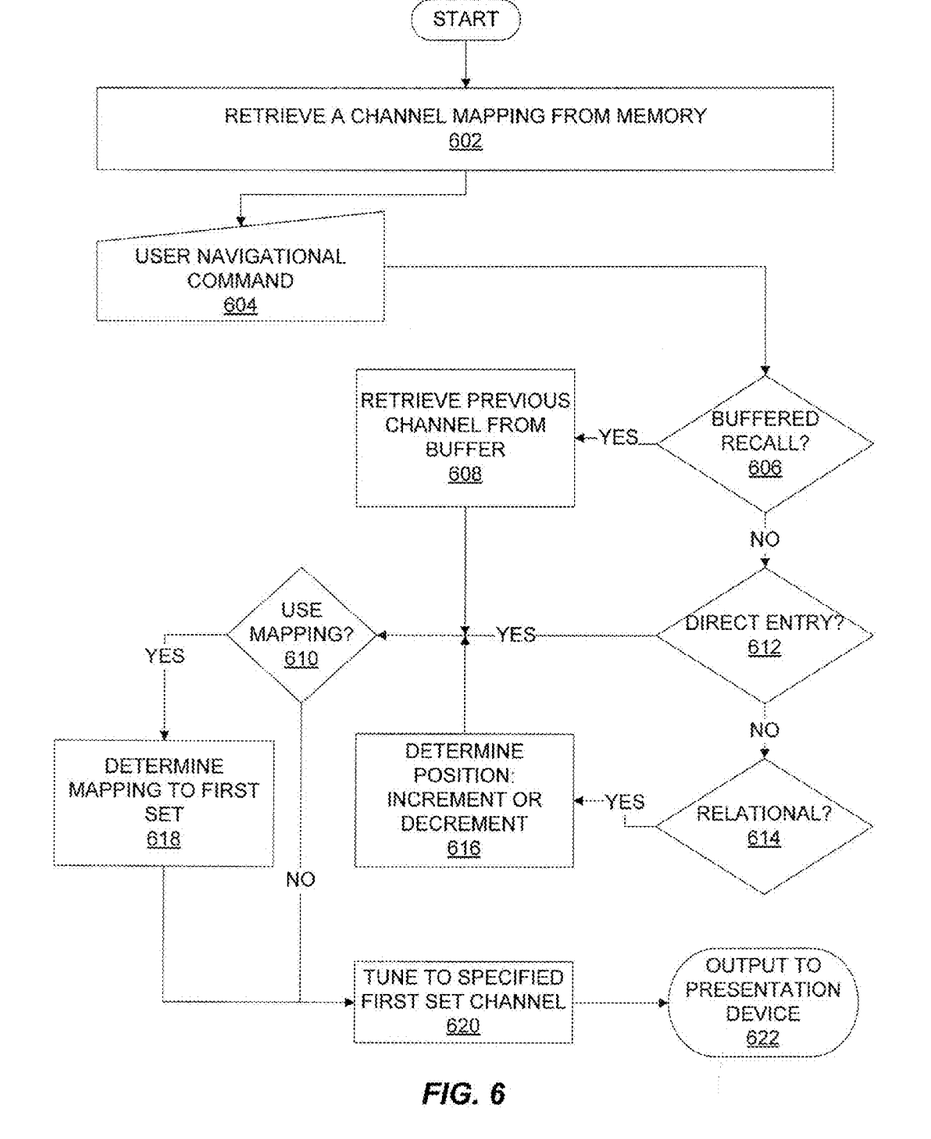
FIG. 6 represents an embodiment of a process for navigating a set of channels on a television receiver.

FIG. 6 represents an embodiment of a process for navigating a set of channels on a television receiver. The process of FIG. 6 will be described in the context of receiving a request to access a television channel and is described in relation to the communication system 100 illustrated in FIGS. 1-2. However, it is to be appreciated that the process may be applied to accessing other types of content and may be applied by devices other than the television receiver 106A. The process of FIG. 6 is not all-inclusive and may include other operations not illustrated for the sake of brevity.

The process includes retrieving a channel mapping from a storage device 214 (operation 602). More particularly, the channel mapping correlates a first set of channel identifiers to a second set of channel identifiers for a plurality of channels receivable by the television receiver 106A.

The process further includes receiving a user navigational command from an input device, such as the remote control 110 (see FIG. 1) (operation 604). The user navigational command may be a direct channel entry, a channel up command, a channel down command, a recall command or the like. It is to be appreciated that the navigational command may comprise any type of user input command utilized in an association with a television receiver 106A.

In operation 606, the control logic 208 determines whether the user navigational command is a recall command. If the user navigational command comprises a recall command, then processing continues in operation 608 and the previously accessed channel is retrieved from memory and is set as the selected channel. Processing then continues in operation 610. If the user navigational command does not comprise a recall command, then processing continues in operation 612.

In operation 612, the control logic 208 determines whether the user navigational command is a direct entry command (e.g., the user 112 entered a specified channel number). If the user navigational command comprises a direct entry command, then processing continues in operation 610 and the user input is set as the selected channel. If the user navigational command does not comprise a recall command, then processing continues in operation 614.

In operation 614, the control logic 208 determines whether the user navigational command is a relational command (e.g., channel up or channel down command). If the user navigational command comprises a relational command, then processing continues in operation 616 and the control logic determines the selected channel position based on a direction of the relational command. Processing then continues in operation 610.

In operation 610, the control logic 208 determines whether to use the mapping to process the user navigational command. For example, user settings of the television receiver 106A may specify whether to use the mapping. In another embodiment, the user 112 may provide input in association with the user navigation command specifying whether to use the mapping of channel identifiers or the content provider assigned channel identifiers. If no mapping is to be utilized, then processing continues in operation 620 and the control logic 208 commands the communication interface 202 to tune to the selected channel specified by one of the first set of channel identifiers and the output module 212 outputs the selected channel to the presentation device for viewing by the user 112 (operation 622).

If the control logic determines in operation 610 that the mapping should be utilized, then processing continues in operation 618. In operation 618, the control logic correlates the selected channel specified by one of the second set of channel identifiers to a corresponding one of the first set of channel identifiers. Processing then continues in operation 620 and the control logic 208 commands the communication interface 202 to tune to the selected channel specified by the correlated one of the first set of channel identifiers. The output module 212 further outputs the selected channel to the presentation device for viewing by the user 112 (operation 622).

Although specific embodiments were described herein, the scope of the invention is not limited to those specific embodiments. The scope of the invention is defined by the following claims and any equivalents therein.

I claim:

1. An apparatus comprising:
   a communication interface operable to receive a plurality of channels from a first content provider;
   an input interface operable to receive user input;
   an output interface communicatively coupled to a presentation device; and
   control logic operable to:
   determine a first set of channel identifiers assigned by the first content provider to identify the plurality of channels;
   receive a second set of channel identifiers identifying the plurality of channels, wherein the input interface is operable to receive the second set of channel identifiers via user input, the second set of channel identifiers being a user defined custom set of channel identifiers, one or more values of the second set of custom identifiers having been specified directly by the user through the input interface and the second set of custom identifiers comprise a second content provider's channel identifier set and a pre-generated mapping correlating the first set of channel identifiers and the second set of channel identifiers, the second content provider being separate from and different than the first content provider;
   generate a content selection menu for presentation to a user;
   receive a user input requesting to view a selected channel of the plurality of channels, the user input specifying a selected one channel identifier of the second set of channel identifiers;
   correlate the selected one channel identifier of the second set of channel identifiers with one channel identifier of the first set of channel identifiers corresponding to the selected channel;
   command the communication interface to receive the selected channel; and
   initiate output of the selected channel to the presentation device via the output interface.

2. The apparatus of claim 1, wherein the content selection menu includes at least a demarcation element for differentiating a first channel identifier from a second channel identifier of the second set of channel identifiers, the demarcation element being a "#" symbol.

3. The apparatus of claim 1, wherein the content selection menu includes at least a demarcation element for differentiating a first channel identifier from a second channel identifier of the second set of channel identifiers, the demarcation element being a differing font.

4. The apparatus of claim 1, wherein the communication interface is operable to receive the second set of channel identifiers as user input from a remotely located application server.

5. The apparatus of claim 1, wherein the first set of channel identifiers has at least a portion of channel identifiers that maps to the second set of channel identifiers and wherein the control logic is operable to correlate the related identifiers in the second set with those in the first set.

6. The apparatus of claim 1, further comprising memory operable to store a mapping between at least a portion of the first identifiers and a portion of the second set of channel identifiers.

7. The apparatus of claim 1, wherein the apparatus comprises a television receiver and wherein the output interface is operable to output audio and video content to the presentation device.

8. A method of outputting programming content, the method comprising:
   receiving, through a communication interface, a first set of channel identifiers assigned by a first content provide;
   receiving a second set of channel identifiers for the plurality of channels, wherein the communication interface is operable to receive the second set of channel identifiers via user input and the second set of channel identifiers being a user defined custom set of channel identifiers, one or more values of the second set of custom identifiers having been specified directly by the user through the communication interface and the second set of custom identifiers comprise a second content provider's channel identifier set and a pre-generated mapping correlating the first set of channel identifiers and the second set of channel identifiers, the second content provider being separate from and different than the first content provider;
   determining, in a control logic, whether to apply the second set of channel identifiers for user navigation of the plurality of channels;
   storing a relationship between the first set of channel identifiers, the second set of the identifiers and the plurality of channels;
   identifying a presentation order of the plurality of channels based on the second set of channel identifiers;
   generating an electronic programming guide viewable on a presentation device based on the presentation order; and
   initiating output of the electronic programming guide to the presentation device via the output interface.

9. The method of claim 8, wherein generating the electronic programming guide comprises:
   generating a graphical element corresponding with at least one selected channel, the graphical element displaying at least one of the first set of channel identifiers, at least one of the second set of channel identifiers and associated channel data corresponding with the at least one selected channel.

10. The method of claim 9, wherein generating the electronic programming guide comprises:
    generating a demarcation element indicating whether a displayed identifier for at least one channel is associated with the second set of channel identifiers, the demarcation element being one of a symbol and a differing font.

11. The method of claim 8, wherein the generation of the electronic programming guide is ordered based on the correlated second set of channel identifiers.

12. A method of user navigation of a plurality of channels, the method comprising:
    receiving, through a communication interface, a first set of channel identifiers assigned by a first content provider;
    generating a user interface for presentation to a user, the user interface allowing the user to define a custom set of channel identifiers for the plurality of channels;
    receiving a second set of channel identifiers, the second set of channel identifiers being the user defined custom set of channel identifiers, one or more values of the second set of custom identifiers having been specified directly by the user through the user interface and the second set of custom identifiers comprising a second content provider's channel identifier set and a pre-generated mapping correlating the first set of channel identifiers and the second set of channel identifiers, the second content provider being separate from and different than the first content provider;

determining, in a control logic, whether to apply the second set of channel identifiers for user navigation of the plurality of channels;

storing a relationship between the first set of channel identifiers, the second set of channel identifiers and the plurality of channels;

receiving a user input indicating a navigational command for a selected channel;

responsive to receiving the user input, determining, in a control logic, the selected channel based on the navigational command;

commanding the communication interface to receive the selected channel; and initiating output of the selected channel to the presentation device for presentation.

13. The method of claim 12, wherein receiving user input indicating a navigation command further comprises receiving a direct numeric specification of the selected channel.

14. The method of claim 12, wherein receiving user input indicating a navigation command further comprises receiving a demarked numeric specification of the selected channel, the demarked numeric specification indicating a selection made from the second set of channel identifiers.

15. The method of claim 14, wherein receiving the demarked numeric specification of the selected channel further comprises:

receiving a demarcation input indicating whether to navigate the plurality of channels using the first set of channel identifiers or the second set of channel identifiers; and receiving a direct channel identifier, associated with the first set of channel identifiers, corresponding with the selected channel.

16. The method of claim 12, wherein receiving the user input indicating the navigation command further comprises receiving a relational command.

17. The method of claim 16, wherein the relational command requests to navigate the plurality channels in an order indicated by the second set of channel identifiers.

18. The method of claim 12, wherein receiving the user input indicating the navigational command further comprises receiving a recall command requesting to navigate back to a previously selected channel.

\* \* \* \* \*

UNITED STATES PATENT AND TRADEMARK OFFICE
CERTIFICATE OF CORRECTION

| | | |
|---|---|---|
| PATENT NO. | : 9,148,612 B2 | Page 1 of 1 |
| APPLICATION NO. | : 12/824020 | |
| DATED | : September 29, 2015 | |
| INVENTOR(S) | : Eric Holley | |

It is certified that error appears in the above-identified patent and that said Letters Patent is hereby corrected as shown below:

In the claims

Column 14, Lines 11-12:
"receiving, through a communication interface, a first set of channel identifiers assigned by a first content provide;" should read, --receiving, through a communication interface, a first set of channel identifiers assigned by a first content provider;--.

Signed and Sealed this
Fifth Day of April, 2016

Michelle K. Lee
*Director of the United States Patent and Trademark Office*